March 24, 1953 G. H. WHITESIDE 2,632,519
CRASH CONTROLLED SAFETY DEVICE FOR MOTOR VEHICLES
Filed Dec. 5, 1949 3 Sheets-Sheet 2
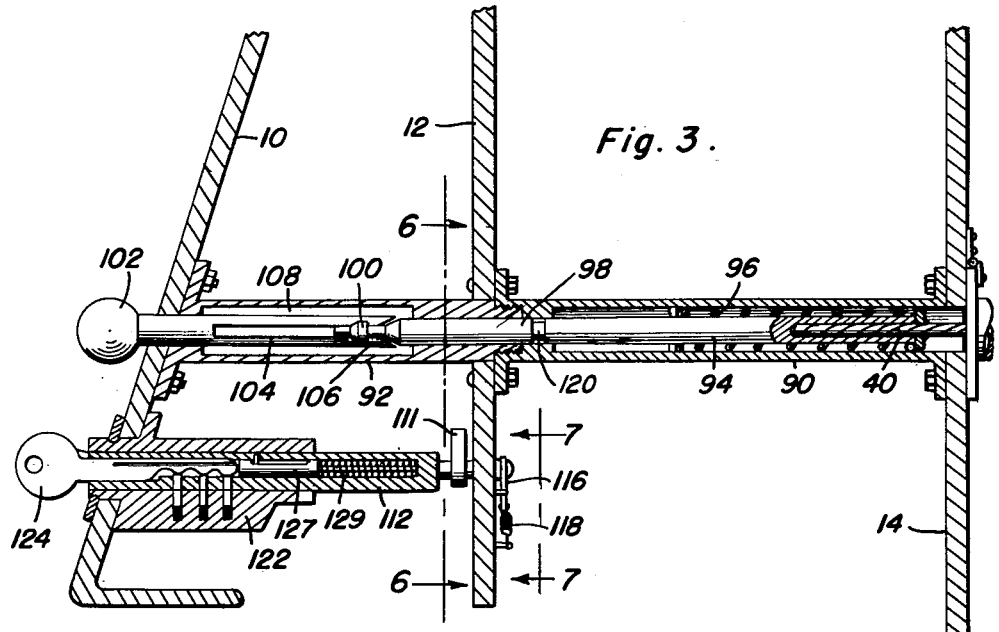
Inventor
Glenn H. Whiteside
By Clarence A. O'Brien
and Harvey B. Jacobson
Attorneys March 24, 1953 G. H. WHITESIDE 2,632,519
CRASH CONTROLLED SAFETY DEVICE FOR MOTOR VEHICLES
Filed Dec. 5, 1949 3 Sheets-Sheet 3
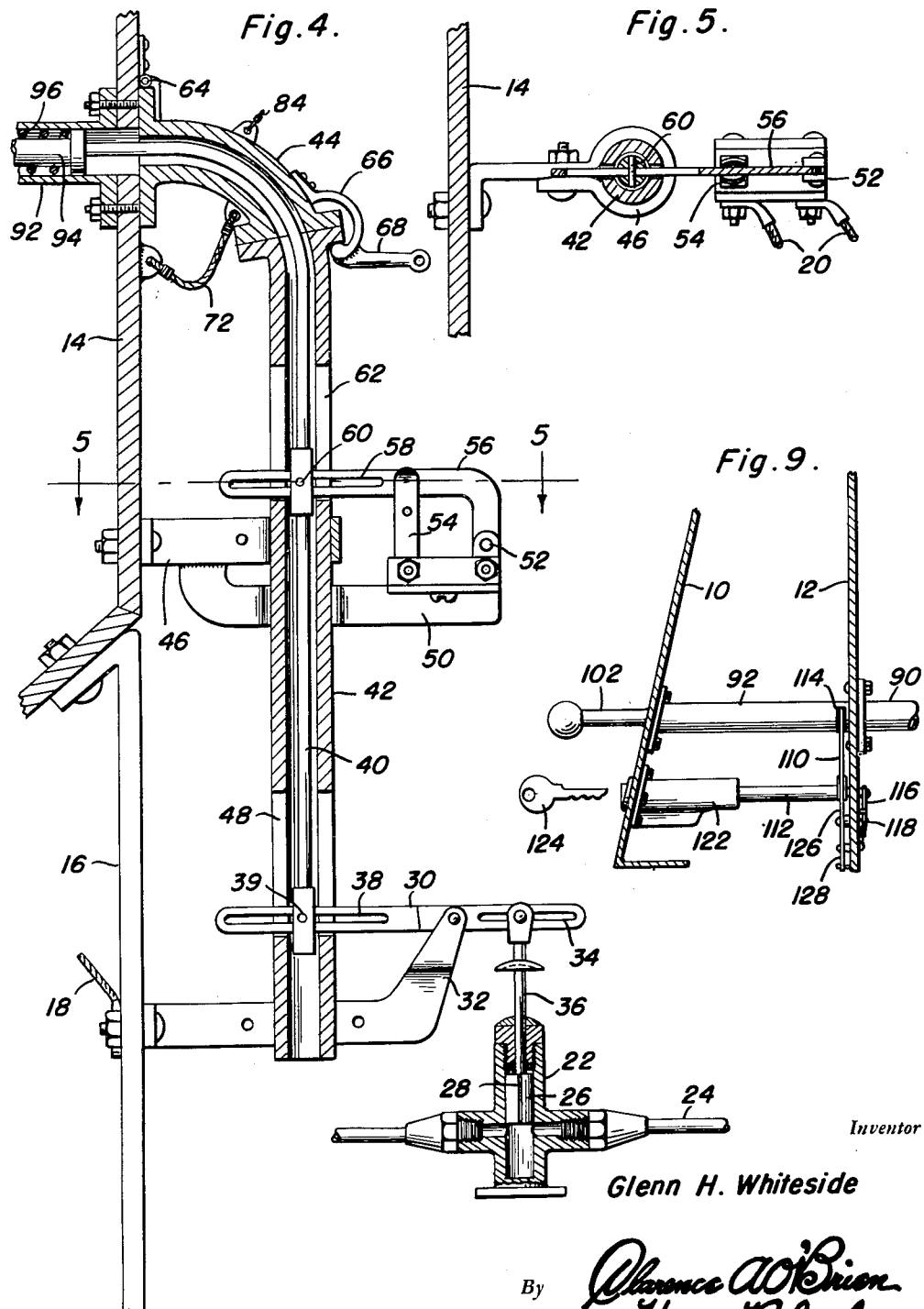
Inventor
Glenn H. Whiteside Patented Mar. 24, 1953

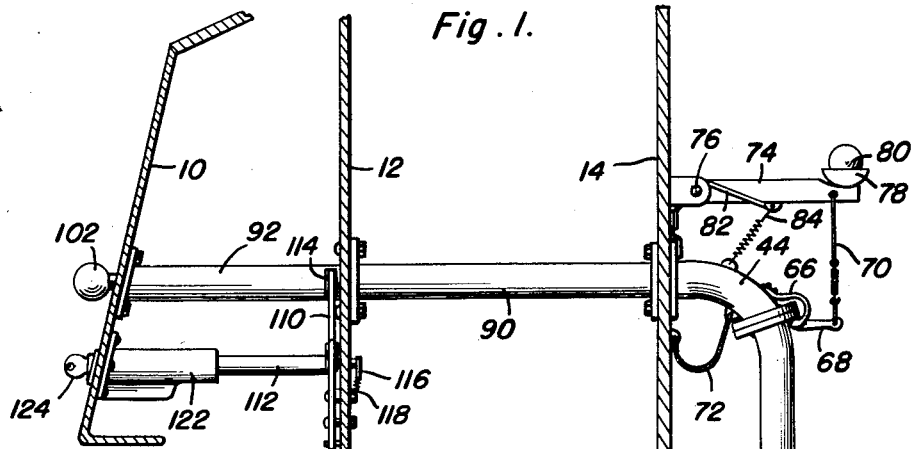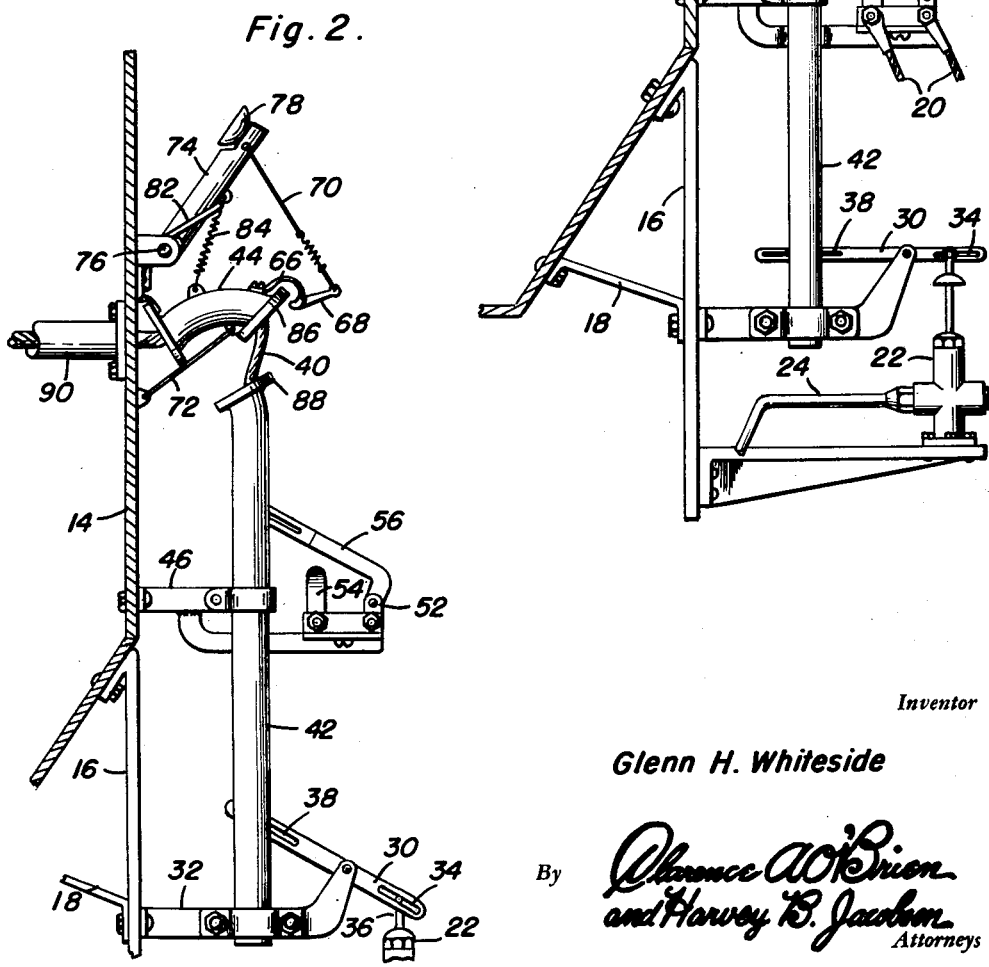

2,632,519

UNITED STATES PATENT OFFICE 2,632,519

CRASH CONTROLLED SAFETY DEVICE FOR MOTOR VEHICLES

Glenn H. Whiteside, Excelsior Springs, Mo.

Application December 5, 1949, Serial No. 131,182

1 Claim. (Cl. 180—82)

This invention relates generally to safety and protective devices for motor vehicles and more particularly to remote control means for closing a valve in the fuel line in the motor vehicle and a switch in the ignition circuit of the motor in the vehicle, combined with means for locking the valve in closed position and the switch in open position, along with manual as well as automatic operating means for the device.

A primary object of the invention is to provide means for lessening the danger of fire and explosion in the event of a crash, collision or upset during the operation of the motor vehicle.

Another object of this invention is to provide a means for locking the control means for the device so as to discourage unauthorized persons from attempting to operate the vehicle, this feature of the invention being closely allied with the feature relating to the provision of manual as well as impact controlled operating means for the device.

Still another object of this invention is to provide a specific locking means of novel and improved character.

Yet another object of this invention is to provide means for automatically operating the device in the event of a crash, this object relating specifically to the mechanical construction of the means provided for such automatic operation.

Another object of this invention is to provide means whereby the manual operation of the device does not disturb the impact controlled operating means, so that the device may be used as a lock for the vehicle with convenience.

A last object to be mentioned specifically is to provide a device of this character which is relatively inexpensive and practicable to manufacture, easily installed on many different types of vehicles, simple and convenient to operate under all conditions, and generally efficient and durable in service.

With these objects definitely in view, this invention resides in certain novel construction, arrangement and combination of elements hereinafter referred to in the specification, illustrated in the drawings and pointed out in the appended claim.

In the drawings:

Figure 1 is a vertical sectional view showing certain portions of a motor vehicle with this invention operatively mounted thereon;

Figure 2 is an elevational view of a portion of the invention, showing one of the parts of the tube enclosing the operating cable in a second position, as when the impact released means has been placed in operation, the other elements concerned being also shown in a corresponding second position;

Figure 3 is a vertical sectional view showing that portion of the invention not included in Figure 2, on an enlarged scale to amplify the disclosure thereof;

Figure 4 is an enlarged view, partially in vertical section, of the major portion of the structure shown in Figure 2 but illustrating the parts of the tube as being connected or latched together and the other elements concerned being in corresponding positions;

Figure 5 is a horizontal sectional view, taken substantially on the line 5—5 of Figure 4;

Figure 6 is an enlarged vertical sectional view taken on the line 6—6 in Figure 3 to amplify the disclosure of the locking means in the device;

Figure 7 is a side elevational view taken from the position indicated at 7—7 in Figure 3;

Figure 8 is a diagrammatic assembly view showing the connections of the invention with the fuel line and ignition circuit of the vehicle; and Figure 9 is a grouped view, vertical sectional in character, showing the manually controlled operating handle withdrawn to the position wherein the fuel line valve is closed and the switch is opened, and this figure also indicates the key of the locking mechanism withdrawn.

Similar characters of reference designate similar or identical elements and portions throughout the specification and throughout the different views of the drawings.

Referring now to the drawings in detail, this invention is adapted to be used in an environment including a vehicle having an instrument board 10, a dashboard 12 and a fire wall 14. According to this invention, the fire wall 14 may have an extension 16 secured thereto by any suitable structure such as a brace 18, in order to provide support for certain portions of this invention.

If reference be had to Figure 8, it will be noted that the device includes a switch described hereinafter and inserted in a circuit of the electrical ignition system of the vehicle, diagrammatically indicated at 20, while a valve 22 is operatively inserted in the fuel line 24. The valve 22 includes a valve plunger 26 having a groove 28 therein to prevent the occurrence of a fluid lock in the valve, and the valve is operated by an arm 30 pivotally mounted on a bracket member 32 which is, in turn, rigidly supported upon the fire wall extension 16. An elongated slot 34 is formed in the arm 30 and a valve stem 36 is rigidly secured at one end to the valve plunger 26 and slidably mounted on the arm 30 by a pin extending through the other end of the valve stem and through the slot 34. The arm 30 has a second elongated slot 38 and a similar transverse pivot pin 39 is used to connect the arm 30 with an operating cable 40, the pin 39 being carried by a terminal on the cable 40 and extending through the slot 38. The cable 40 is threaded through a tube which is divided into two parts 42 and 44, the lower of the two parts 42 being rigidly secured to the vehicle by means of a bracket 46 of any suitable design. A slot 48 in the tube part 42 is provided to receive an end portion of the arm 30 and to allow movement of this arm relative to the said part of the tube 42.

A portion 50 of the bracket 46 supports a switch having a pivot terminal 52 and a bifurcated spring terminal 54 connected as already mentioned and illustrated in Figure 8 in the ignition circuit of the vehicle, the pivot terminal 52 supporting a switch bar 56 adapted to open and close the circuit. The switch bar 56 has an end portion of insulative material with an elongated slot 58 through which is inserted a pin 60 carried by an intermediate portion of the operating cable 40, and it will be noted that the tube part 42 is slotted as at 62 to allow the operative mounting of the switch bar 56 with the portion thereof having the elongated slot 58 extending through the tube for connection with the pin 60.

The tube part 44 is pivoted as indicated at 64 on the fire wall 14 and a latch 66, preferably of simple spring clip character as illustrated, is used to connect the tube parts 42 and 44 of the tube together, an arm 68 being carried by the latch 66 and operated by a cable member 70, while the pivotal movement of the tube part 44 is limited by check cable 72. Impact released means is provided by this invention for the automatic operation of the tube part 44, this means including an arm 74 pivoted at 76 on the fire wall 14 and terminating in a cup 78 adapted to hold a heavy mass indicated by the ball 80 so that the arm 74 is weighted into substantially horizontal position by the force of gravity acting upon the arm and the mass 80 against the action of a spring 82 which biases the arm 74 to pivot upwardly. A link 84 which may be of extensible spring character connects the arm 74 with the tube part 44. The tube parts 42 and 44 are each provided with matching and coacting terminal flanges 86 and 88 which are held together by the latch 66 until such time as this latch is released by the dislodgement of the ball 80 from the cup 78 and consequent action of the impact released means described immediately above.

Other tube parts 90 and 92 enclose the remaining portions of the operating cable 40, these parts being mounted between the fire wall and the dash board 12 and between the dash board 12 and the instrument panel 10, respectively. A plunger 94 may be considered as constituting a portion of the cable 40 and this plunger is reciprocatively mounted within the tube parts 90 and 92, and a spring 96 is arranged coaxially of the plunger 94 and connected so that the plunger is biased as to the right in Figure 3. An extending portion of the plunger indicated at 98 terminates in a head 100 separated from the portion 98 of the plunger by a reduced neck, and a knob-ended handle 102 is slidably mounted in the tube part 92 so that a bifurcated portion of the handle coacts with the head 100 so that the cable 40 can be pulled in one direction but cannot be pushed in the reverse direction by means of the handle 102, this construction including slightly resilient arms 104 on the handle 102 and hooks 106 on the ends of the arms 104 adapted to engage the head 100, it being noted that the head 100 and the outer ends of the hooks 106 are beveled so that the handle can be pushed inwardly to allow the hooks to slide over the head 100 in one direction while grasping the head when the handle is pulled in the opposite direction, and it should be also noted that a clearance 108 is provided between the arms 104 and the tube part 92 so that the arms can spread apart sufficiently to straddle the head and allow the hooks to slide over the head 100 when the handle is pushed inwardly.

This invention also includes means to lock the cable against movement after the cable has been shifted by the outward manual movement of the handle 102. This lock construction is best illustrated in Figures 1, 6 and 9. The latch bar 110 is pivotally mounted upon the dashboard 12 and an eccentric 111 is mounted on a shaft 112, the shaft being mounted upon both the instrument panel 10 and the dashboard 12. The tube part 92 is provided with a lateral recess 114 and the shaft 112 is biased to rotate in one direction by means of an arm 116 on the end of the shaft and a spring 118, so that the upper end of the latch bar 110 may enter the recess 114 to engage a reduced portion 120 of the plunger 94 to hold this plunger in the position assumed thereby when the handle 102 is fully extended, the drawings illustrating a latch bar 110 formed with an offset portion at its upper end and bifurcated to straddle the reduced portion 120 of the plunger when the same is in locked position. A key-operated lock 122 is operatively associated with the shaft 112, so that a key 124 may be used to control the movement of the shaft 112, this arrangement making it possible for the operator of the vehicle to lock the plunger 94 in a switch opening valve closing position when he leaves the vehicle, thus preventing unauthorized use of the vehicle. The latch bar 110 is biased to pivot toward the tube part 92 by plate 126 pivoted on the dashboard 12 and spring biased as indicated at 128 in Figure 6, so that the latch bar 110 will be retained in locking position when the key 124 is withdrawn. A plunger 127 is slidably mounted within the cylinder 112 and biased by a spring 129 to eject the key 124 as soon as the operator releases pressure thereon, thus preventing the key from being inadvertently left in the device. In this connection, the key 124 is used to release the lock mechanism only, the latch bar 110 being constantly biased into locking position and engaging the reduced portion 120 to lock the mechanism whenever the handle 102 is pulled.

The operation of this invention will be clearly understood from a consideration of the foregoing description of the mechanical details thereof, taken in connection with the drawings and the above recited objects. In recapitulation, the switch will ordinarily be closed and the valve opened and the handle 102 will be in the position indicated in Figure 1 while the impact released means will also be as illustrated in Figure 1. Upon the occasion of a collision or similar mishap to the vehicle the ball 80 will be dislodged from the cup 78 and the tube part 44 will be released from the tube part 42, as illustrated in Figure 2. The cable 40 will be pulled in a manner also clearly illustrated in Figure 2 so as to open the switch and close the valve, thus preventing or at least reducing the hazard of fire in the vehicle. However, the device is also manually operative, the handle 102 being shiftable as to the left in Figure 1 into the position indicated in Figure 9, whereupon the cable 40 will be shifted, without disturbance of the impact released means, and the switch thus opened and the valve thus closed at the option of the operator of the vehicle. The operator may take this action when he believes his vehicle cannot be prevented from being in collision with another vehicle or the like, or the operator may operate the handle 102 and lock the device by means of the key 124 when he leaves the vehicle to prevent unauthorized use of the vehicle, all as will be clearly understood from the foregoing description. The tube parts may be bent so that the valve and switch can be located at the most desirable location with a view to most effective operation and greatest protection.

Having described the invention, what is claimed as new is:

A safety device for an automobile having a fire wall comprising a tube mounted on said wall including an upper section hinged to said wall and a lower rigid section, said upper section being swingable upwardly on its hinge relative to the lower section, a cable extending into said tube and movable upwardly by upward swinging of said upper section, an automobile arresting lever connected to said cable below said upper section for upward swinging by upward movement of said cable, impact means for swinging said upper section comprising a pivoted arm on said wall spring urged upwardly, a weight seated on said arm and counterbalancing the same against the action of said spring and adapted to be dislodged from said arm by impact, an operating connection between said arm and said upper section, and a latch preventing upward movement of said upper section released by initial upward swinging of said arm.

GLENN H. WHITESIDE.

REFERENCES CITED

The following references are of record in the file of this patent:

UNITED STATES PATENTS

| Number | Name | Date |
| --- | --- | --- |
| 1,238,989 | Cooper | Sept. 4, 1917 |
| 1,956,484 | Bate | Apr. 24, 1934 |
| 2,198,677 | Mueller, Sr. | Apr. 30, 1940 |
| 2,223,097 | Ehret | Nov. 26, 1940 |
| 2,253,957 | Kammerdiner | Aug. 26, 1941 |